United States Patent
Nagai et al.

(10) Patent No.: US 12,103,647 B2
(45) Date of Patent: Oct. 1, 2024

(54) SOLAR PANEL MODULE FIXED TO A FLOAT

(71) Applicant: KYORAKU CO., LTD., Kyoto (JP)

(72) Inventors: Hirofumi Nagai, Osaka (JP); Takaya Niimi, Tokyo (JP)

(73) Assignee: KYORAKU CO., LTD., Kyoto (JP)

( * ) Notice: Subject to any disclaimer, the term of this patent is extended or adjusted under 35 U.S.C. 154(b) by 288 days.

(21) Appl. No.: 17/251,933

(22) PCT Filed: Jun. 19, 2019

(86) PCT No.: PCT/JP2019/024313
§ 371 (c)(1),
(2) Date: Dec. 14, 2020

(87) PCT Pub. No.: WO2020/004180
PCT Pub. Date: Jan. 2, 2020

(65) Prior Publication Data
US 2021/0261225 A1     Aug. 26, 2021

(30) Foreign Application Priority Data

Jun. 25, 2018 (JP) ................ 2018-120239

(51) Int. Cl.
*H02S 20/20* (2014.01)
*B63B 35/00* (2020.01)
(Continued)

(52) U.S. Cl.
CPC ............. *B63B 35/44* (2013.01); *B63B 35/00* (2013.01); *H02S 20/10* (2014.12); *H02S 20/20* (2014.12); *B63B 2035/4453* (2013.01)

(58) Field of Classification Search
CPC ........ H02S 30/10; H02S 20/20; B63B 35/44; B63B 35/00; B63B 2035/4453
See application file for complete search history.

(56) References Cited

U.S. PATENT DOCUMENTS 6,311,436 B1 * 11/2001 Mimura ................ H01L 31/048
52/173.3
2014/0224165 A1    8/2014 Veloso et al.
(Continued)

FOREIGN PATENT DOCUMENTS

CN        107733325 A    2/2018
CN        108183667 A    6/2018
(Continued)

OTHER PUBLICATIONS

English translation of Kobayashi et al., JP2018-030588.*
(Continued)

*Primary Examiner* — Niki Bakhtiari
(74) *Attorney, Agent, or Firm* — Maier & Maier, PLLC (57) ABSTRACT

A structure capable of suppressing load applied to a solar panel module due to thermal expansion and contraction of a float. Provided is a structure including a float, a solar panel module having a plate portion, and a supporting member fixed to the float and supporting the plate portion. The plate portion is supported to be movable relative to the supporting member, and a cushioning member is disposed between the supporting member and the plate portion.

6 Claims, 11 Drawing Sheets

(51) Int. Cl.
*B63B 35/44* (2006.01)
*H02S 20/10* (2014.01)

(56) References Cited

U.S. PATENT DOCUMENTS

2017/0085214 A1 3/2017 Niimi
2019/0341877 A1 11/2019 Niimi

FOREIGN PATENT DOCUMENTS

| | | | | | |
|---|---|---|---|---|---|
| JP | 2002-173083 | A | | 6/2002 | |
| JP | 2003-209274 | A | | 7/2003 | |
| JP | 2006100392 | A | * | 4/2006 | ............. F24S 25/20 |
| JP | 2014-511043 | A | | 5/2014 | |
| JP | 2018-016286 | A | | 2/2018 | |
| JP | 2018-030588 | A | | 3/2018 | |
| RU | 2593434 | C1 | * | 8/2016 | ............. F24J 2/5211 |
| WO | 2015174205 | A1 | | 11/2015 | |

OTHER PUBLICATIONS

English translation of Kusakabe et al., JP2003-209274.*
English Translation of Beuke et al., RU-2593434 C1.*
English Translation of Ito, JP2006100392-A (Year: 2006).*
International Search Report issued on Sep. 10, 2019 of corresponding International Application No. PCT/JP2019/024313; 5 pgs.
Office Action issued on Jul. 15, 2022, in connection with corresponding Indian Patent Application No. 202147002277 (5 pages).
Office Action issued on Feb. 21, 2023, in corresponding Chinese Application No. 201980028759.1; 10 pages.

* cited by examiner

SOLAR PANEL MODULE FIXED TO A FLOAT

TECHNICAL FIELD

The present invention relates to a structure including a float, a supporting member, and a solar panel module.

BACKGROUND ART

Patent Literature 1 discloses a state in which a solar panel module is fixed to a float.

CITATION LIST

Patent Literature

Patent Literature 1: JP-A-2018-16286

SUMMARY OF INVENTION

Technical Problem

Since upper and lower ends of the solar panel module are fixed to the float in Patent Literature 1, a load is applied to the solar panel module due to thermal expansion and contraction of the float.

The present invention has been made in view of such circumstances and provides a structure capable of suppressing the load applied to the solar panel module due to the thermal expansion and contraction of the float.

Solution to Problem

According to the present invention, provided is a structure, comprising: a float; a solar panel module comprising a plate portion; and a supporting member fixed to the float and supporting the plate portion, wherein the plate portion is supported to be movable relative to the supporting member, and a cushioning member is disposed between the supporting member and the plate portion.

Since the plate portion of the solar panel module is supported to be movable with respect to the supporting member in the configuration of the present invention, it is possible to suppress the load applied to the solar panel module due to the thermal expansion and contraction.

In addition, it was found in such a configuration that an unpleasant contact noise may be generated when the solar panel module moves relative to the supporting member. To address this issue, it has been further found that the generation of contact noise can be suppressed by disposing the cushioning member between the supporting member and the plate portion, and the present invention has been completed.

Hereinafter, various embodiments of the present invention will be exemplified. The embodiments described below can be combined with each other.

Preferably, in the structure, the supporting member comprises an engagement groove engaged with the plate portion, and the plate portion is configured to be movable in the engagement groove.

Preferably, in the structure, the solar panel module comprises a solar panel, and a frame supporting the solar panel, the plate portion is provided on the frame, and the engagement groove is configured to open in an outward direction of the frame.

Preferably, in the structure, the solar panel module comprises a solar panel, the plate portion is provided on the solar panel, and the engagement groove is configured to open in an inward direction of the solar panel.

Preferably, in the structure, a distance between inner surfaces in the engagement groove of the supporting member is larger than a thickness of the plate portion.

Preferably, in the structure, the cushioning member is fixed to the supporting member outside the engagement groove and is not fixed to the supporting member inside the engagement groove.

Preferably, in the structure, the supporting member is configured to support the plate portion provided on an upper side of the frame.

BRIEF DESCRIPTION OF DRAWINGS

FIG. 6A is a cross-sectional view in which an area C in FIG. 5B is enlarged and a plate portion 6ua is separated from an engagement groove 2a.

FIG. 6B is a cross-sectional view corresponding to FIG. 5B, showing a state before the cushioning member 10 is inserted into the engagement groove 2a.

DESCRIPTION OF EMBODIMENTS

Hereinafter, embodiments of the present invention will be described. Various characteristics described in the embodiments below can be combined with each other. Further, the invention is independently established for each characteristic.

1. First Embodiment

Figure 1:
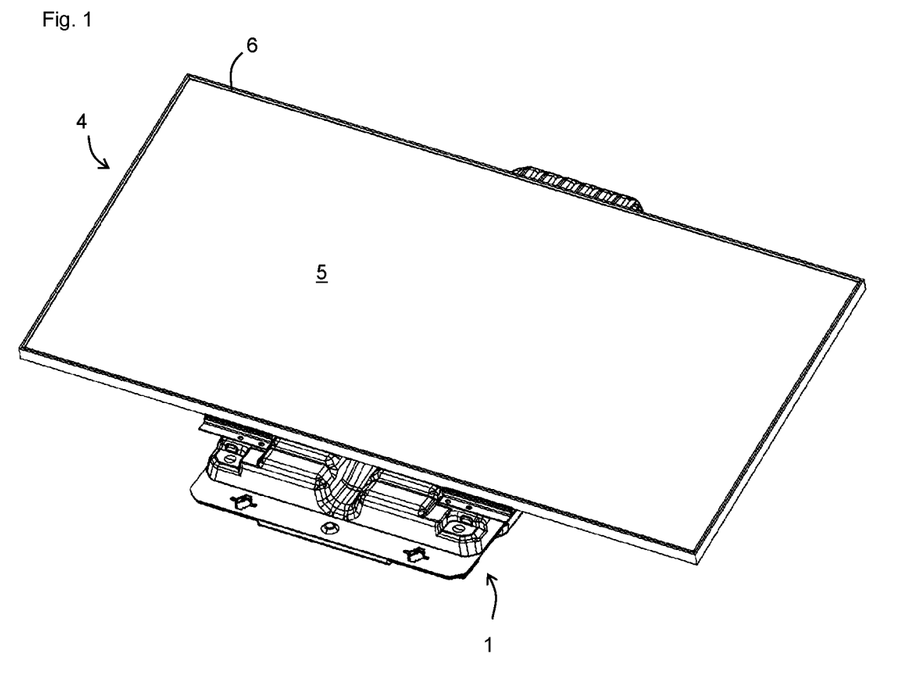
FIG. 1 is a perspective view of a structure in which a solar panel module 4 is mounted on a float 1, according to a first embodiment of the present invention.
Figure 2:
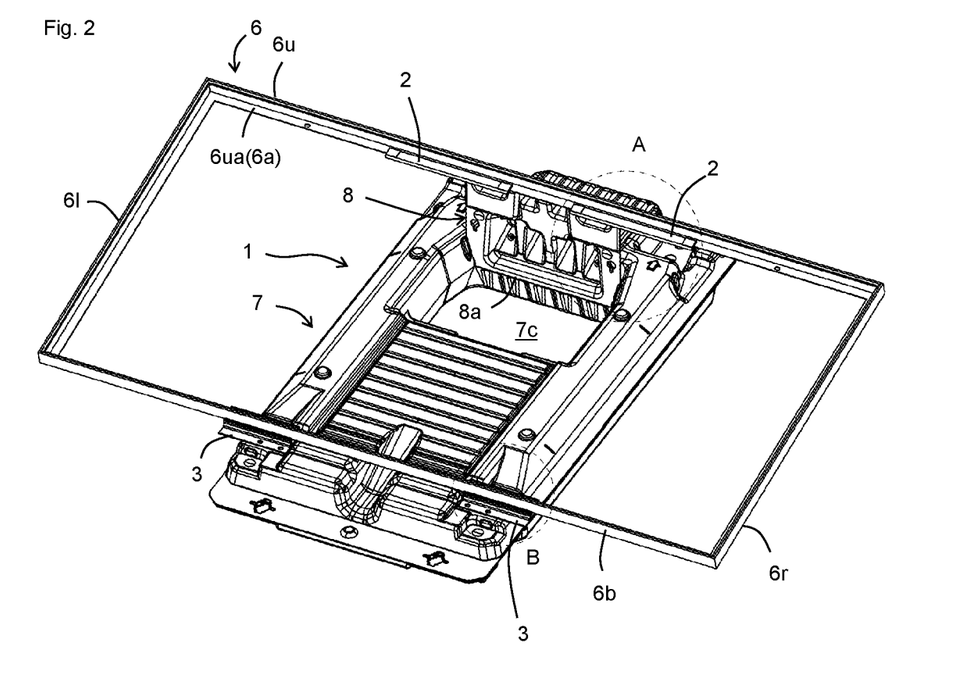
FIG. 2 is a perspective view when a solar panel 5 is removed from the solar panel module 4 of the structure in FIG. 1.

A first embodiment of the present invention will be described with reference to FIG. 1 to FIG. 10. As shown in FIG. 1 to FIG. 2, a structure of the present embodiment includes a float 1, an upper supporting member 2, a lower supporting member 3, and a solar panel module 4. In the present embodiment, the upper supporting member 2 corresponds to the "supporting member" in Claims.

<Float 1>

The float 1 supports the solar panel module 4 having a substantially rectangular shape so that shorter sides of the solar panel module 4 can be inclined, as shown in FIG. 1, and is used for installing the solar panel module 4 on water, such as a pond or a lake.

The float 1 is manufactured by blow molding in which a molten cylindrical parison is sandwiched and inflated between a plurality of split molds, and has a structure having a hollow portion for accommodating gas (air or the like) inside. Various kinds of thermoplastic resin can be used as material for molding the float 1, and for example, polyolefin resin, such as polyethylene and polypropylene, can be preferably used.

As shown in FIG. 2, the float 1 includes a main body 7 and an erected wall 8. The erected wall 8 is provided to rise from the main body 7. The float 1 can be manufactured by forming a molded body including the main body 7 and the erected wall 8, cutting sides other than a side 8a serving as a hinge when erecting the erected wall 8, and then rotating and erecting the erected wall 8 around the side 8a. In this process, an opening 7c is formed in the part of the main body 7 where the erected wall 8 was originally formed.

<Solar Panel Module 4>

Figure 5A:
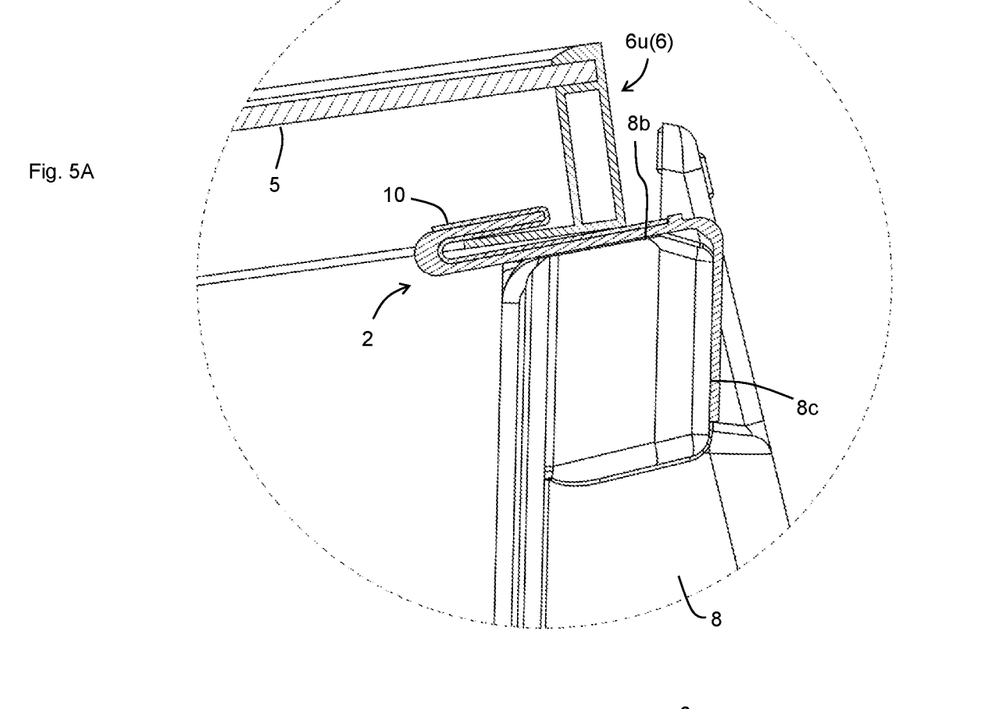
FIG. 5A is a cross-sectional view of FIG. 1 in a cross section passing through a cushioning member 10 on the right side in FIG. 3B.
Figure 5B:
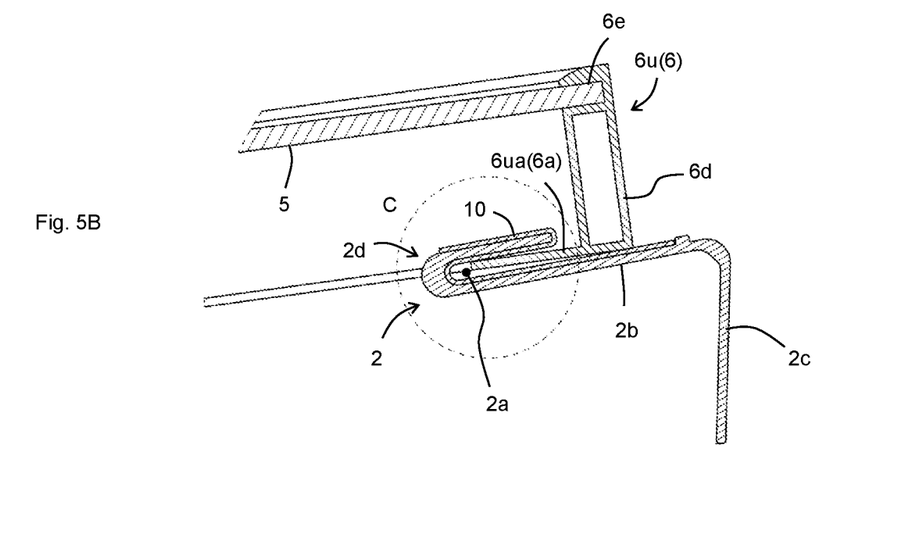
FIG. 5B is a cross-sectional view in which an erected wall 8 is excluded from FIG. 5A.

As shown in FIG. 1, the solar panel module 4 includes a solar panel 5 and a frame 6 supporting the solar panel 5. The frame 6 has a rectangular shape surrounding the solar panel 5 and includes an upper side 6u, a lower side 6b, a right side 6r, and a left side 6l. As shown in FIG. 5B, each side is provided with a plate portion 6a extending from a base portion 6d in an inward direction of the frame 6. The base portion 6d is provided with an engagement concave portion 6e to which the solar panel 5 can be attached.

<Upper Supporting Member 2, Cushioning Member 10>

As shown in FIG. 3A to FIG. 6B, the upper supporting member 2 is fixed to an upper end of the erected wall 8. A plate portion 6ua of the upper side 6u is supported by the upper supporting member 2. The upper supporting member 2 has an engagement groove 2a opening in an outward direction of the frame 6. The plate portion 6ua is engaged with the engagement groove 2a, so that the plate portion 6ua is supported by the upper supporting member 2.

The upper supporting member 2 includes an upper wall portion 2b, a side wall portion 2c, and a U-shaped portion 2d. The upper wall portion 2b and the side wall portion 2c are flat and abut respectively on an upper surface 8b and a side surface 8c of the erected wall 8. The U-shaped portion 2d has a U-shape and is provided to be continuous with the upper wall portion 2b. The U-shaped portion 2d is provided with the engagement groove 2a.

The upper supporting member 2 is an elongated member, and a pair of upper supporting members 2 are fixed to the erected wall 8. The upper supporting members 2 are fixed to the erected wall 8 to protrude from the erected wall 8. One upper supporting member 2 protrudes to the right side of the erected wall 8, and the other upper supporting member 2 protrudes to the left side of the erected wall 8.

The upper supporting member 2 has a mounting hole 2c1 on the side wall portion 2c and can be fixed to the erected wall 8 by inserting a bolt (not shown) into the mounting hole 2c1 and screwing this bolt into a rasp-cut nut embedded in the erected wall 8.

Figure 6A:
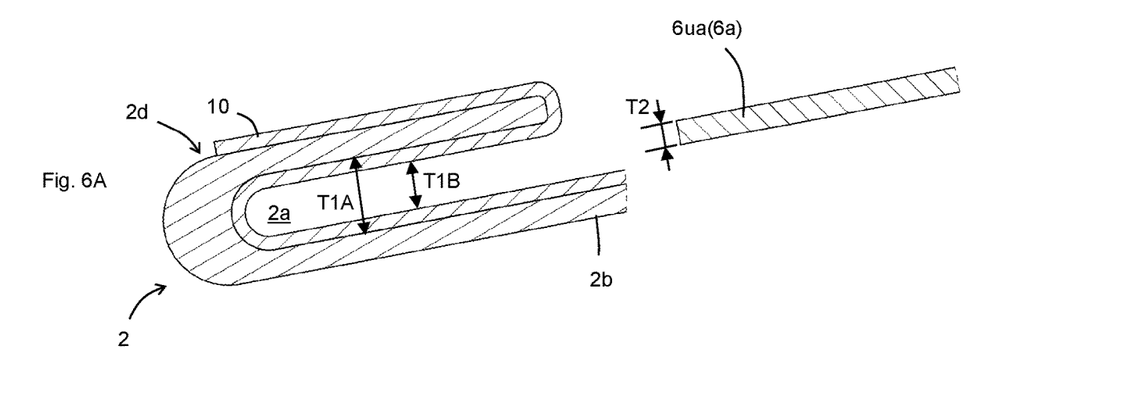

The plate portion 6ua is not fixed to the engagement groove 2a and is movable relative to the engagement groove 2a. Further, as shown in FIG. 6A, the distance T1A between the inner surfaces in the engagement groove 2a of the upper supporting member 2 is larger than the thickness T2 of the plate portion 6ua. Further, the distance T1B between the inner surfaces of the cushioning member 10 in the engagement groove 2a is equal to or larger than the thickness T2 of the plate portion 6ua. Consequently, the plate portion 6ua can easily move relative to the engagement groove 2a. The value of T1A/T2 is, for example, 1.2 to 3.0, and specifically, for example, 1.2, 1.4, 1.6, 1.8, 2.0, 2.2, 2.4, 2.6, 2.8, 3.0, and may be within the range between any two of the numerical values exemplified herein. The value of T1B/T2 is, for example, 0.8 to 2.8, and specifically, for example, 0.8, 0.9, 1.0, 1.1, 1.2, 1.4, 1.6, 1.8, 2.0, 2.2, 2.4, 2.6, 2.8, and may be within the range between any two of the numerical values exemplified herein. When the cushioning member 10 is a member that can be easily compressed, such as a non-woven fabric, the plate portion 6ua can move relative to the engagement groove 2a even if T1B/T2 is 0.8 to 1.

With such a configuration, the plate portion 6ua is supported to be movable with respect to the upper supporting member 2. Consequently, the plate portion 6ua can move relative to the upper supporting member 2 as the frame 6 expands or contracts, thereby suppressing the load applied to the solar panel module 4.

The frame 6 and the upper supporting member 2 are preferably made of metal, such as aluminum. Consequently, when the plate portion 6ua moves relative to the upper supporting member 2, they may be rubbed with each other and cause unpleasant contact noise. The cushioning member 10 is provided between the upper supporting member 2 and the plate portion 6ua to suppress the generation of such contact noise. The cushioning member 10 can be made of material that can suppress the generation of contact noise, such as a non-woven fabric.

In this regard, as shown in FIG. 5B, an upper surface of the plate portion 6ua abuts on the cushioning member 10 inside the engagement groove 2a, and a lower surface of the base portion 6d abuts on the cushioning member 10 on the upper wall portion 2b outside the engagement groove 2a.

It is not easy to attach the cushioning member 10 to the inside of the engagement groove 2a. For this reason, the cushioning member 10 is fixed to the upper supporting member 2 outside the engagement groove 2a and is not fixed to the upper supporting member 2 inside the engagement groove 2a. More specifically, both ends 10a, 10b of the cushioning member 10 are fixed to the upper supporting member 2 at positions across the engagement groove 2a, and the other parts are not fixed to the upper supporting member 2. In the present embodiment, both ends 10a, 10b are fixed to an upper surface of the upper wall portion 2b and an upper surface of the U-shaped portion 2d, respectively.

Figure 6B:
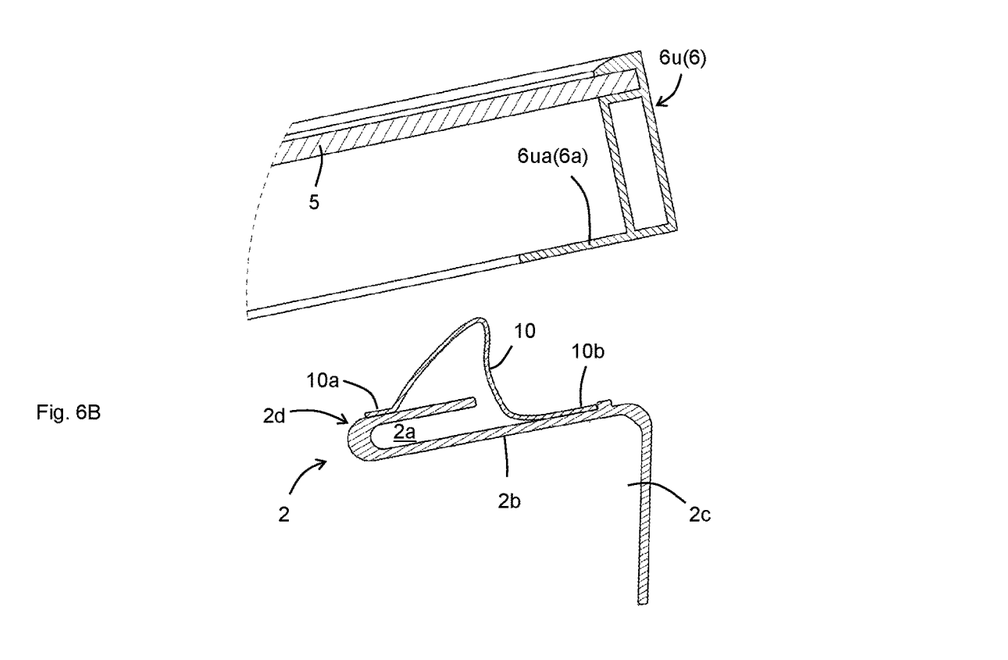

The cushioning member 10 can be disposed inside the engagement groove 2a by pushing the cushioning member 10 into the engagement groove 2a by the plate portion 6ua while both ends 10a, 10b of the cushioning member 10 are fixed to the upper supporting member 2, as shown in FIG. 6B.

Figure 3A:
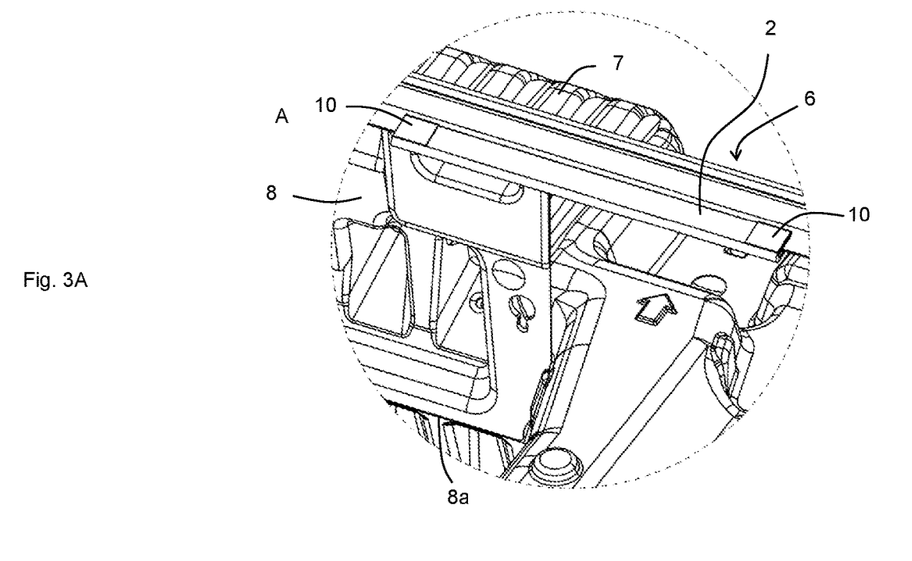
FIG. 3A is an enlarged view of a region A in FIG. 2.
Figure 3B:
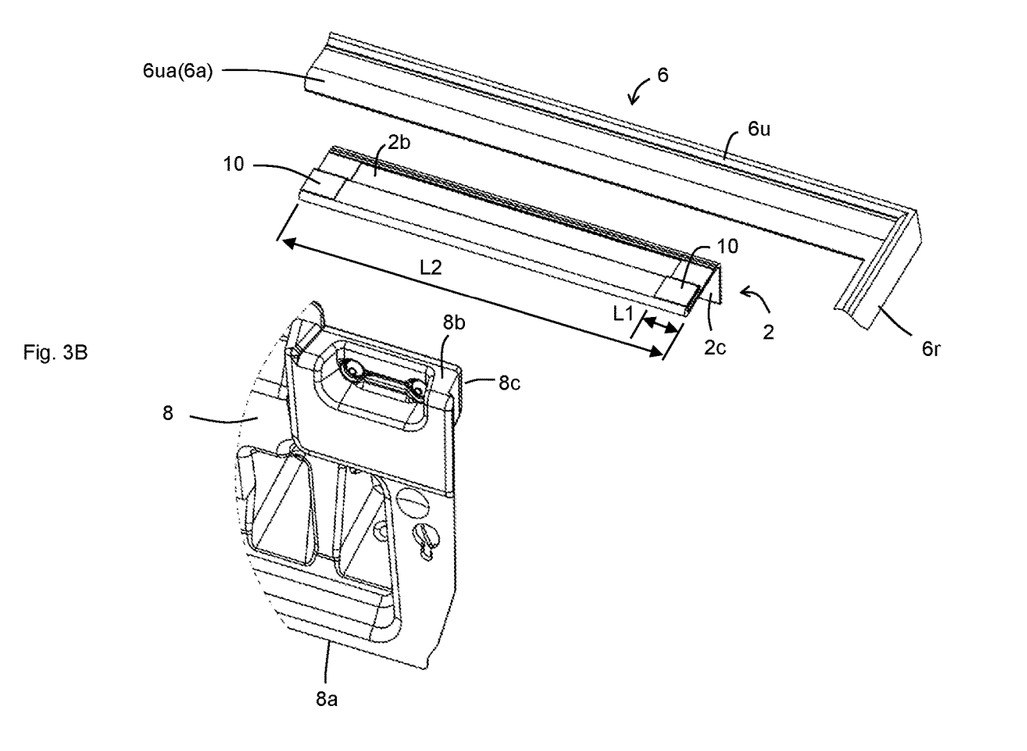
FIG. 3B is an exploded perspective view of FIG. 3A (a main body 7 is not shown).
Figure 4A:
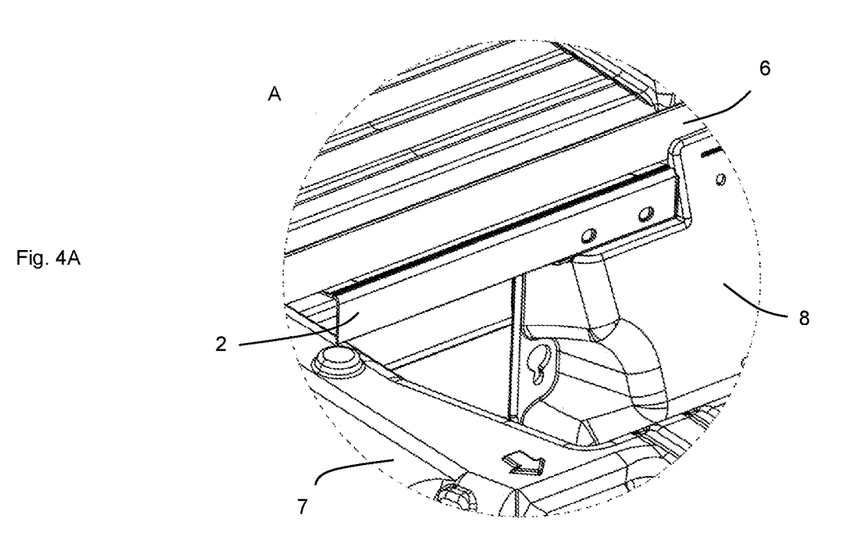
FIG. 4A is an enlarged view of the vicinity of the region A in FIG. 2 from another angle.
Figure 4B:
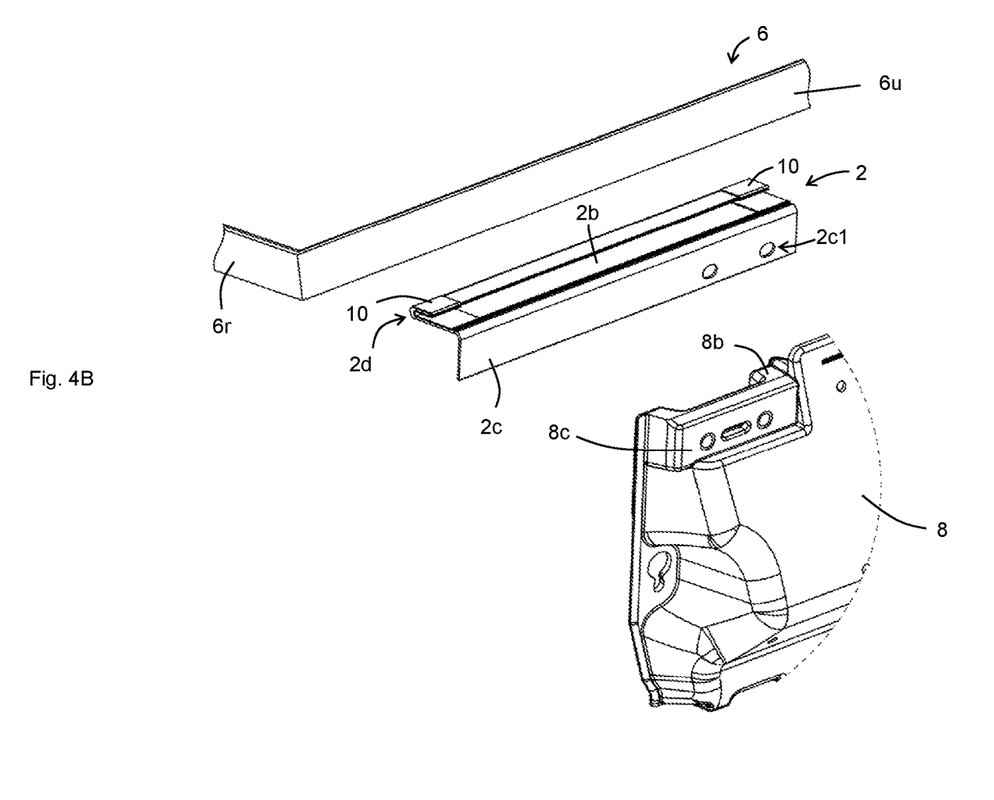
FIG. 4B is an exploded perspective view of FIG. 4A.

The cushioning member 10 has an elongated shape. A plurality of cushioning members 10 are provided at intervals in the longitudinal direction of the upper supporting member 2. In the present embodiment, two cushioning members 10 are provided at both ends of the upper supporting member 2 in the longitudinal direction. As shown in FIG. 3B, the value of (length L1 of the cushioning members 10)/(length L2 of the upper supporting member 2) in the longitudinal direction of the upper supporting member 2 is, for example, 0.05 to 0.4, and preferably 0.1 to 0.3, and specifically, for example, 0.05, 0.1, 0.2, 0.3, 0.4, and may be within the range between any two of the numerical values exemplified herein. By providing a plurality of cushioning members 10 of such an elongated shape, direct contact between the plate portion 6$ua$ and the upper supporting member 2 is avoided while reducing the friction between the cushioning member 10 and the plate portion 6$ua$.

<Lower Supporting Member 3>

As shown in FIG. 7A to FIG. 10, the lower supporting member 3 is fixed to the main body 7. A plate portion 6$ba$ of the lower side 6$b$ is supported by the lower supporting member 3. The lower supporting member 3 includes an engagement groove 3$a$ opening in an outward direction of the frame 6. The plate portion 6$ba$ is engaged with the engagement groove 3$a$, so that the plate portion 6$ba$ is supported by the lower supporting member 3.

The lower supporting member 3 includes an upper portion 3$b$, a lower portion 3$c$, and a U-shaped portion 3$d$. The upper portion 3$b$ and the lower portion 3$c$ are flat and abut respectively on an upper step 7$a$ and a lower step 7$b$ having a stepped structure provided on the main body 7. The U-shaped portion 3$d$ is U-shaped and is provided to be continuous with the upper portion 3$b$. The U-shaped portion 3$d$ is provided with the engagement groove 3$a$.

Figure 9A:
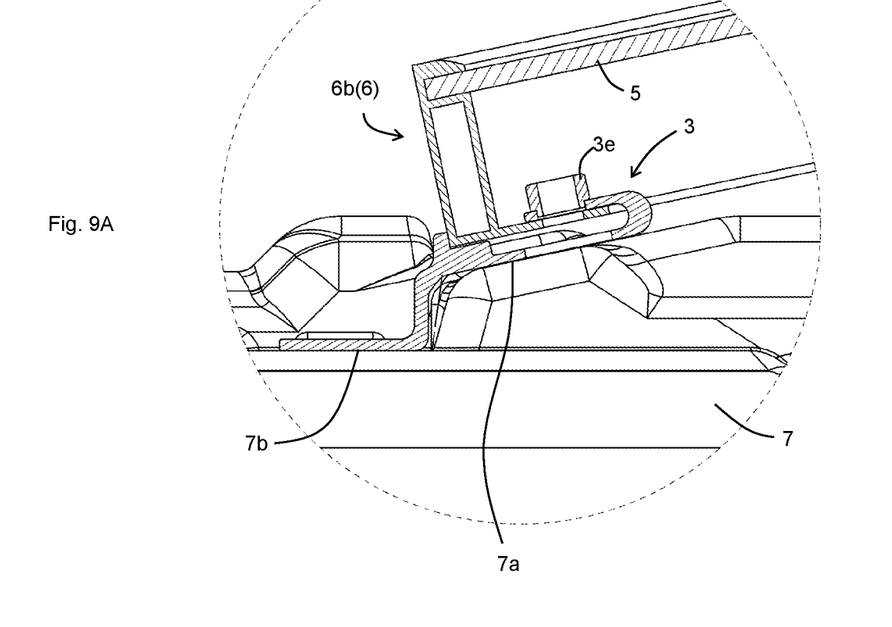
FIG. 9A is a cross-sectional view of FIG. 1 in a cross section passing through a nut 3e.
Figure 9B:
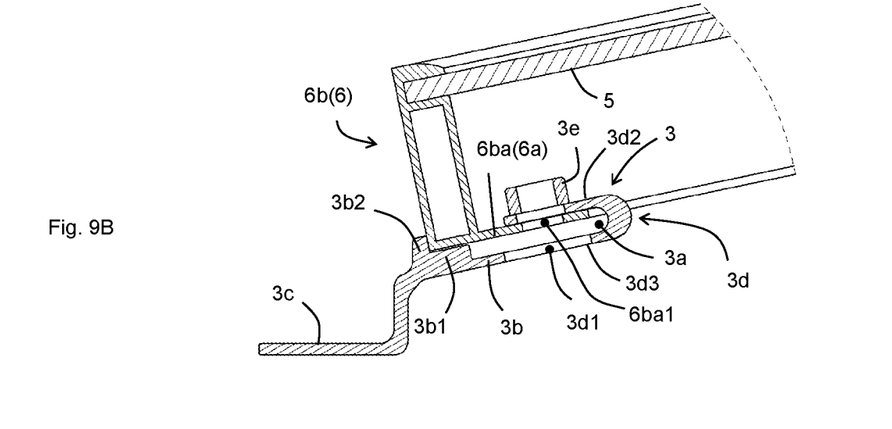
FIG. 9B is a cross-sectional view in which the main body 7 is excluded from FIG. 9A.
Figure 10:
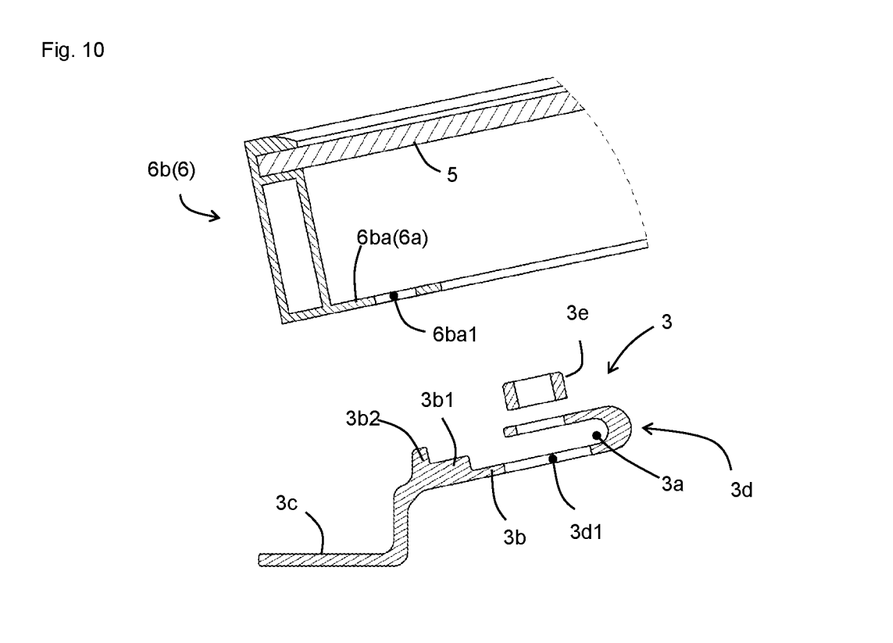
FIG. 10 is an exploded view of FIG. 9B.

As shown in FIG. 9A to FIG. 10, the upper portion 3$b$ is provided with a pedestal portion 3$b$1, and the pedestal portion 3$b$1 is provided with a locking projection 3$b$2. The pedestal portion 3$b$1 is a portion formed one step higher, and the locking projection 3$b$2 is a projection protruding from the pedestal portion 3$b$1 in the out-of-plane direction. The lower side 6$b$ is placed on the pedestal portion 3$b$1 and is locked by the locking projection 3$b$2.

The lower supporting member 3 is an elongated member, and a pair of lower supporting members 3 are fixed to the main body 7. The lower supporting members 3 are fixed to the main body 7 to protrude from the main body 7. One lower supporting member 3 protrudes to the right side of the main body 7, and the other lower supporting member 3 protrudes to the left side of the main body 7.

Figure 7A:
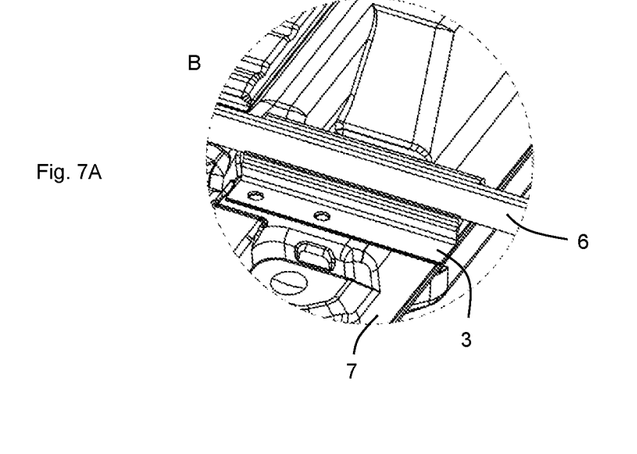
FIG. 7A is an enlarged view of a region B in FIG. 2.
Figure 7B:
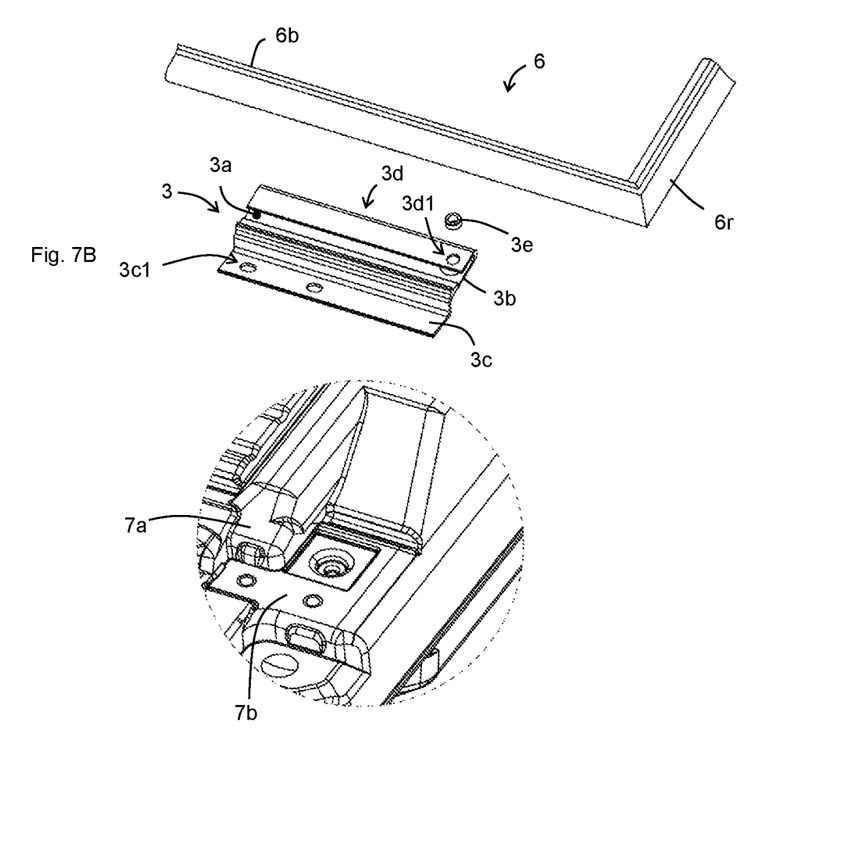
FIG. 7B is an exploded perspective view of FIG. 7A.
Figure 8A:
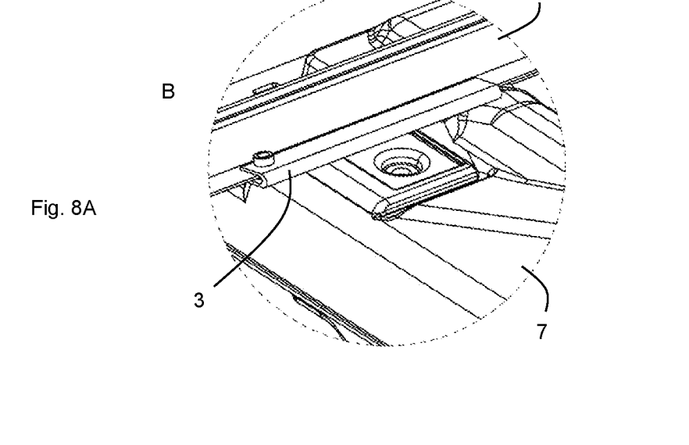
FIG. 8A is an enlarged view of the vicinity of the region B in FIG. 2 from another angle.
Figure 8B:
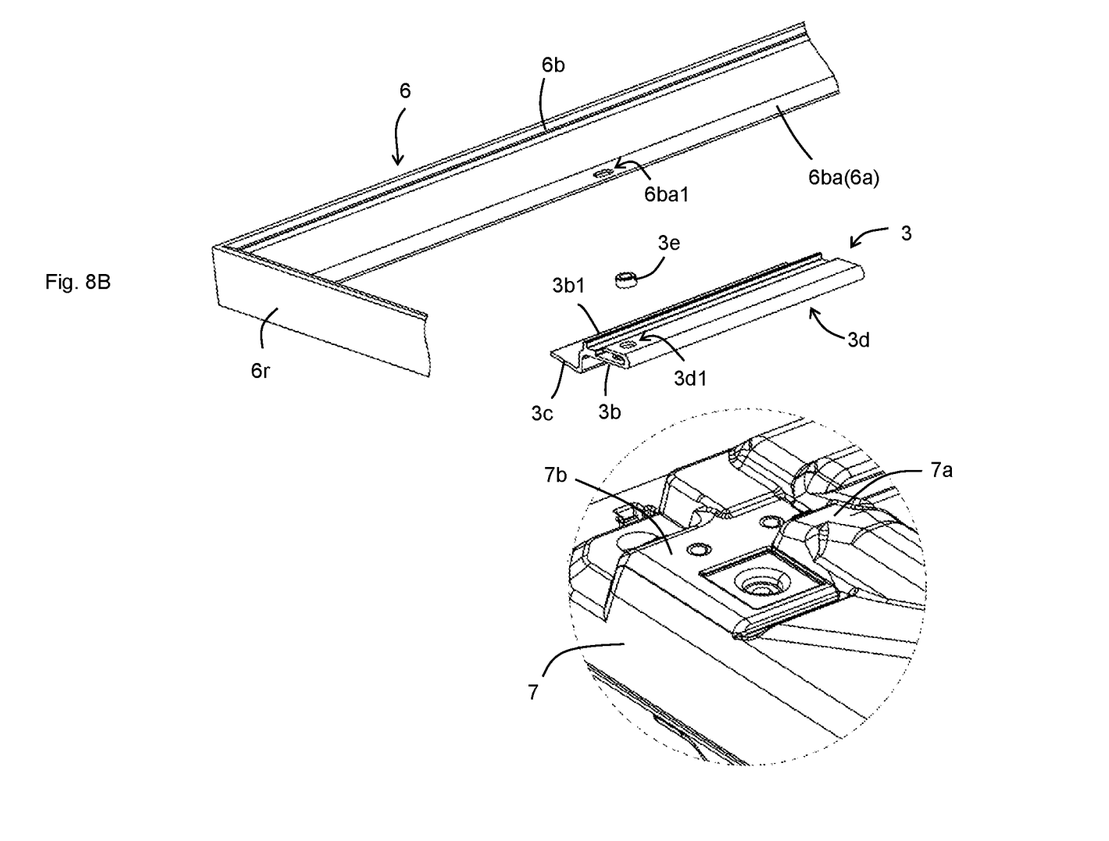
FIG. 8B is an exploded perspective view of FIG. 8A.

As shown in FIG. 7B, the lower supporting member 3 has a mounting hole 3$c$1 on the lower portion 3$c$ and can be fixed to the main body 7 by inserting a bolt (not shown) into the mounting hole 3$c$1 and screwing this bolt into a rasp-cut nut embedded in the lower step 7$b$.

As shown in FIG. 8A to FIG. 9B, the plate portion 6$ba$ is fixed with respect to the engagement groove 3$a$. A through hole 3$d$1 penetrating the U-shaped portion 3$d$ is provided at a position where the lower supporting member 3 protrudes from the main body 7. Further, the plate portion 6$ba$ is provided with a through hole 6$ba$1 at a position facing the through hole 3$d$1. As shown in FIG. 9B, the plate portion 6$ba$ can be fixed to the engagement groove 3$a$ by inserting a bolt (not shown) into the through holes 3$d$1, 6$ba$1 from a side of a lower surface 3$d$3 of the U-shaped portion 3$d$ and screwing it into a nut 3$e$ disposed on an upper surface 3$d$2 of the U-shaped portion 3$d$ while the lower side 6$b$ is placed on the pedestal portion 3$b$1 and abuts on the locking projection 3$b$2.

2. Second Embodiment

Figure 11:
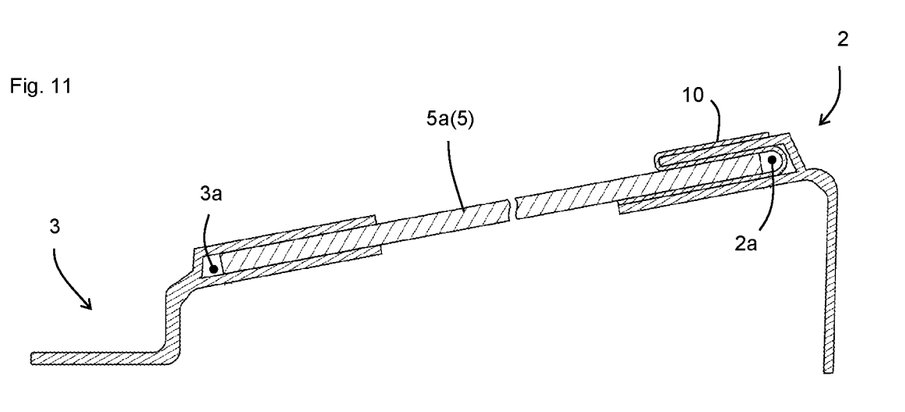
FIG. 11 is a cross-sectional view of a state in which the solar panel 5 is supported by supporting members 2, 3, according to a second embodiment of the present invention.

The structure of the second embodiment of the present invention is similar to the first embodiment, and the main difference is in the configuration of the solar panel module 4 and the engagement grooves 2$a$, 3$a$. Hereinafter, the difference will be mainly described.

In the present embodiment, the solar panel module 4 does not include the frame 6, and the solar panel 5 is directly supported by the supporting members 2, 3.

The engagement grooves 2$a$, 3$a$ open in an inward direction of the solar panel 5, and the engagement grooves 2$a$, 3$a$ engage with a plate portion 5$a$ provided on the solar panel 5. As is the case with the first embodiment, the plate portion 5$a$ can move relative to the upper supporting member 2, and the cushioning member 10 is disposed between the upper supporting member 2 and the plate portion 5$a$.

3. Other Embodiments

The lower supporting member 3 may be omitted, so that a lower end of the solar panel module 4 is directly supported by the float 1.

The plate portion may be supported to be movable relative to the lower supporting member 3, and the cushioning member may be disposed between the lower supporting member 3 and the plate portion. In this case, the plate portion may be fixed with respect to the upper supporting member 2, and the upper supporting member 2 may be omitted, so that an upper end of the solar panel module 4 is directly supported by the float 1.

REFERENCE SIGNS LIST

1: float, 2: upper supporting member, 2$a$: engagement groove, 2$b$: upper wall portion, 2$c$: side wall portion, 2$c$1: mounting hole, 2$d$: U-shaped portion, 3: lower supporting member, 3$a$: engagement groove, 3$b$: upper portion, 3$b$1: pedestal portion, 3$b$2: locking projection, 3$c$: lower portion, 3$d$1: mounting hole, 3$d$: U-shaped portion, 3$d$1: through hole, 3$d$2: upper surface, 3$d$3: lower surface, 3$e$: nut, 4: solar panel module, 5: solar panel, 5$a$: plate portion, 6: frame, 6$a$: plate portion, 6$b$: lower side, 6$ba$: plate portion, 6$ba$1: through hole, 6$d$: base portion, 6$e$: engagement concave portion, 6$l$: left side, 6$r$: right side, 6$u$: upper side, 6$ua$: plate portion, 7: main body, 7$a$: upper step, 7$b$: lower step, 7$c$: opening, 8: erected wall, 8$a$: side, 8$b$: upper surface, 8$c$: side surface, 10: cushioning member, 10$a$: end, 10$b$: end

The invention claimed is:

1. A structure, comprising:
a float;
a solar panel module comprising a plate portion; and
a supporting member fixed to the float and supporting the plate portion, the supporting member having an interior surface including a U-shaped engagement groove and an upper wall portion extending from an end of the U-shaped engagement groove, the interior surface engaged with the plate portion, wherein the plate portion is supported to be movable relative to the supporting member within the U-shaped engagement groove, and a cushioning member is disposed between the supporting member and the plate portion, and a first end of the cushioning member is directly fixed to an exterior surface of the supporting member outside the U-shaped engagement groove of the supporting member, and a second end of the cushioning member is fixed to the upper wall portion of the interior surface of the supporting member, and the exterior surface faces the interior surface.

2. The structure of claim 1, wherein the solar panel module comprises a solar panel, and a frame supporting the solar panel, the plate portion is provided on the frame, and the U-shaped engagement groove is configured to open in a direction of an outer edge of the frame.

3. The structure of claim 1, wherein the solar panel module comprises a solar panel, the plate portion is provided on the solar panel, and the U-shaped engagement groove is configured to open in an inward direction of the solar panel relative to an edge of the solar panel.

4. The structure of claim 1, wherein a distance between inner surfaces in the U-shaped engagement groove of the supporting member is larger than a thickness of the plate portion.

5. The structure of claim 2, wherein the supporting member is configured to support the plate portion provided on an upper side of the frame.

6. The structure of claim 1, wherein the cushioning member is non-woven.

* * * * *